United States Patent
Lin et al.

(10) Patent No.: US 11,796,768 B2
(45) Date of Patent: Oct. 24, 2023

(54) CAMERA OPTICAL LENS INCLUDING FIVE LENSES OF-+++-REFRACTIVE POWERS

(71) Applicant: AAC Optics (Changzhou) Co., Ltd., Changzhou (CN)

(72) Inventors: Chiacheng Lin, Shenzhen (CN); Wen Sun, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 531 days.

(21) Appl. No.: 17/131,778

(22) Filed: Dec. 23, 2020

(65) Prior Publication Data
US 2022/0011546 A1 Jan. 13, 2022

(30) Foreign Application Priority Data
Jul. 9, 2020 (CN) .......................... 202010654259.3

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS
2021/0333516 A1* 10/2021 Li ...................... G02B 13/0045

* cited by examiner

*Primary Examiner* — Wen Huang
(74) *Attorney, Agent, or Firm* — W&G Law Group

(57) ABSTRACT

A camera optical lens includes, from an object side to an image side: a first lens having a negative refractive power; a second lens having a positive refractive power; a third lens having a positive refractive power; a fourth lens having a positive refractive power; and a fifth lens having a negative refractive power. $2.50 \le f3/f \le 6.00$, $-2.00 \le R4/R3 \le -1.00$, and $1.00 \le d1/d2 \le 1.80$. f denotes a focal length of the camera optical lens; f3 denotes a focal length of the third lens; R3 denotes a curvature radius of an object-side surface of the second lens; R4 denotes a curvature radius of an image-side surface of the second lens; d1 denotes an on-axis thickness of the first lens; d2 denotes an on-axis distance from an image-side surface of the first lens to an object-side surface of the second lens. The camera optical lens can achieve good optical performance while achieving ultra-thin, wide-angle lenses having large apertures.

10 Claims, 7 Drawing Sheets

CAMERA OPTICAL LENS INCLUDING FIVE LENSES OF-+++-REFRACTIVE POWERS

TECHNICAL FIELD

The present disclosure relates to the field of optical lens, and more particularly, to a camera optical lens suitable for handheld terminal devices such as smart phones or digital cameras and suitable for camera devices such as monitors or PC lenses.

BACKGROUND

With the emergence of smart phones in recent years, the demand for miniature camera lens is increasing day by day, but in general the photosensitive devices of camera lens are nothing more than charge coupled device (CCD) or complementary metal-oxide semiconductor sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market.

In order to obtain better imaging quality, the lens that is traditionally equipped in mobile phone cameras adopts a three-piece or four-piece lens structure. However, with the development of technology and the increase of the diverse demands of users, and as the pixel area of photosensitive devices is becoming smaller and smaller and the requirement of the system on the imaging quality is improving constantly, a five-piece lens structure gradually appears in lens designs. Although the common five-piece lens has good optical performance, its settings on refractive power, lens spacing and lens shape still have some irrationality, which results in that the lens structure cannot achieve a high optical performance while satisfying design requirements for ultra-thin, wide-angle lenses having large apertures.

Therefore, it is necessary to provide a camera optical lens that has good optical performance and satisfies the requirements for ultra-thin, wide-angle, large-aperture design.

SUMMARY

In view of the problems, the present disclosure aims to provide a camera optical lens, which can solve a problem that traditional camera optical lenses are not fully ultra-thinned, large-apertured and wide-angled.

A camera optical lens includes a first lens, a second lens, a third lens, a fourth lens, and a fifth lens that are sequentially arranged from an object side to an image side. The first lens has a negative refractive power, the second lens has a positive refractive power, the third lens has a positive refractive power, the fourth lens has a positive refractive power, and the fifth lens has a negative refractive power. The camera optical lens satisfies: $2.50 \leq f3/f \leq 6.00$; $-2.00 \leq R4/R3 \leq -1.00$; and $1.00 \leq d1/d2 \leq 1.80$, where f denotes a focal length of the camera optical lens; f3 denotes a focal length of the third lens; R3 denotes a curvature radius of an object-side surface of the second lens; R4 denotes a curvature radius of an image-side surface of the second lens; d1 denotes an on-axis thickness of the first lens; and d2 denotes an on-axis distance from an image-side surface of the first lens to the object-side surface of the second lens.

As an improvement, the camera optical lens further satisfies: $-1.50 \leq f5/f4 \leq -1.00$, where f4 denotes a focal length of the fourth lens; and f5 denotes a focal length of the fifth lens.

As an improvement, the camera optical lens further satisfies: $-4.52 \leq f1/f \leq -1.12$, $0.75 \leq (R1+R2)/(R1-R2) \leq 3.07$, and $0.04 \leq d1/TTL \leq 0.17$, where f1 denotes a focal length of the first lens; R1 denotes a curvature radius of an object-side surface of the first lens; R2 denotes a curvature radius of the image-side surface of the first lens; and TTL denotes a total optical length from the object-side surface of the first lens to an image plane of the camera optical lens along an optic axis.

As an improvement, the camera optical lens further satisfies: $0.75 \leq f2/f \leq 3.49$, $-0.65 \leq (R3+R4)/(R3-R4) \leq -0.01$, and $0.08 \leq d3/TTL \leq 0.26$, where f2 denotes a focal length of the second lens; d3 denotes an on-axis thickness of the second lens; and TTL denotes a total optical length from an object-side surface of the first lens to an image plane of the camera optical lens along an optic axis.

As an improvement, the camera optical lens further satisfies: $-13.40 \leq (R5+R6)/(R5-R6) \leq -0.61$ and $0.02 \leq d5/TTL \leq 0.07$, where R5 denotes a curvature radius of an object-side surface of the third lens; R6 denotes a curvature radius of an image-side surface of the third lens; d5 denotes an on-axis thickness of the third lens; and TTL denotes a total optical length from an object-side surface of the first lens to an image plane of the camera optical lens along an optic axis.

As an improvement, the camera optical lens further satisfies: $0.41 \leq f4/f \leq 1.38$, $0.43 \leq (R7+R8)/(R7-R8) \leq 1.93$, and $0.11 \leq d7/TTL \leq 0.38$, where f4 denotes a focal length of the fourth lens; R7 denotes a curvature radius of an object-side surface of the fourth lens; R8 denotes a curvature radius of an image-side surface of the fourth lens; d7 denotes an on-axis thickness of the fourth lens; and TTL denotes a total optical length from an object-side surface of the first lens to an image plane of the camera optical lens along an optic axis.

As an improvement, the camera optical lens further satisfies: $-2.54 \leq f5/f \leq -0.60$, $0.95 \leq (R9+R10)/(R9-R10) \leq 3.97$, and $0.05 \leq d9/TTL \leq 0.17$, where f5 denotes a focal length of the fifth lens; R9 denotes a curvature radius of an object-side surface of the fifth lens; R10 denotes a curvature radius of an image-side surface of the fifth lens; d9 denotes an on-axis thickness of the fifth lens; and TTL denotes a total optical length from an object-side surface of the first lens to an image plane of the camera optical lens along an optic axis.

As an improvement, the camera optical lens further satisfies: $FNO \leq 2.23$, where FNO denotes an F number of the camera optical lens.

As an improvement, the camera optical lens further satisfies: $FOV \geq 119°$, where FOV denotes a field of view of the camera optical lens.

As an improvement, the camera optical lens further satisfies: $2.94 \leq f12/f \leq 42.32$, where f12 denotes a combined focal length of the first lens and the second lens.

the camera optical lens according to the present disclosure achieves high optical performance while satisfying design requirements for ultra-thin, wide-angle lenses having large apertures, especially suitable for camera lens assembly of mobile phones and WEB camera lenses formed by imaging elements for high pixels, such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments.

To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
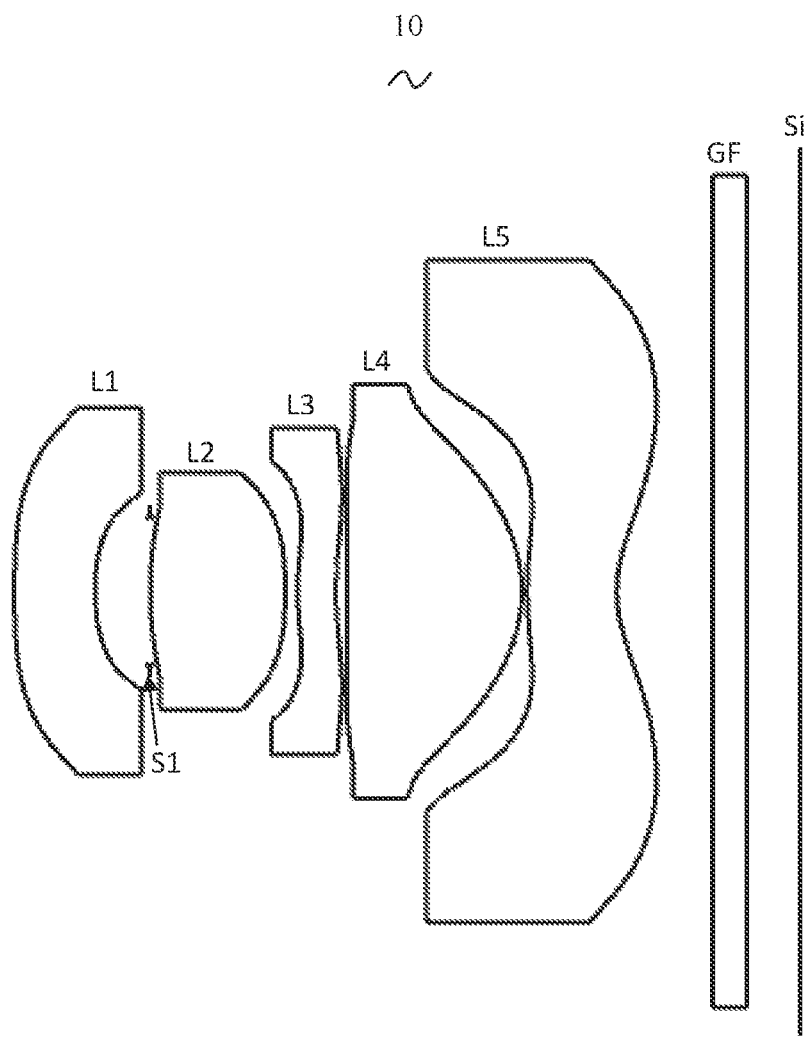
FIG. 1 is a schematic diagram of a structure of a camera optical lens in accordance with Embodiment 1 of the present disclosure.

Referring to FIG. 1 to FIG. 4, the present disclosure provides a camera optical lens 10 in Embodiment 1. In FIG. 1, a left side is an object side, and a right side is an image side. The camera optical lens 10 mainly includes, from an object side to an image side, a first lens L1, an aperture S1, a second lens L2, a third lens L3, a fourth lens L4, and a fifth lens L5. An optical element such as an optical filter GF or a glass plate is arranged between the fifth lens L5 and an image plane Si.

As an example, the first lens L1 is made of a plastic material, the second lens L2 is made of a plastic material, the third lens L3 is made of a plastic material, the fourth lens L4 is made of a plastic material, and the fifth lens L5 is made of a plastic material.

A focal length of the camera optical lens 10 is defined as f, a focal length of the third lens L3 is defined as f3, a curvature radius of an object-side surface of the second lens L2 is defined as R3, a curvature radius of an image-side surface of the second lens L2 is defined as R4, an on-axis thickness of the first lens L1 is defined as d1, and an on-axis distance from an image-side surface of the first lens L1 to an object-side surface of the second lens L2 is defined as d2. The camera optical lens 10 satisfies:

$$2.50 \leq f3/f \leq 6.00 \quad (1);$$

$$-2.00 \leq R4/R3 \leq -1.00 \quad (2); \text{ and}$$

$$1.00 \leq d1/d2 \leq 1.80 \quad (3),$$

where the condition (1) specifies a ratio of the focal length f3 of the third lens L3 to the focal length f, and this condition facilitates to improve a performance of the system.

The condition (2) specifies a shape of the second lens L2. This condition can alleviate deflection of light passing through the lens while effectively reducing aberrations.

When d1/d2 in the condition (3) satisfies the condition, the imaging quality can be improved.

As an example, a focal length of the fourth lens L4 is defined as f4, a focal length of the fifth lens L5 is defined as f5, and the camera optical lens 10 satisfies a condition of $-1.50 \leq f5/f4 \leq -1.00$, which specifies a ratio of the focal length f5 of the fifth lens L5 to the focal length f4 of the fourth lens L4. This condition is beneficial for correction of the field curvature, thereby improving the imaging quality.

The first lens L1 has a negative refractive power, and it includes an object-side surface being convex in a paraxial region and an image-side surface being concave in the paraxial region.

As an example, the focal length of the camera optical lens 10 is f, a focal length of the first lens L1 is defined as f1, and the camera optical lens 10 satisfies a condition of $-4.52 \leq f1/f \leq -1.12$, which specifies a ratio of the negative refractive power of the first lens L1 to the focal length f of the camera optical lens 10. When the condition is satisfied, the first lens L1 has an appropriate negative refractive power, thereby facilitating reducing aberrations of the system while facilitating development towards ultra-thin, wide-angle lenses. As an example, $-2.83 \leq f1/f \leq -1.39$.

As an example, a curvature radius of the object-side surface of the first lens L1 is defined as R1, a curvature radius of the image-side surface of the first lens L1 is defined as R2, and the camera optical lens 10 satisfies a condition of $0.75 \leq (R1+R2)/(R1-R2) \leq 3.07$. This can reasonably control a shape of the first lens L1, so that the first lens L1 can effectively correct spherical aberrations of the system. As an example, $1.20 \leq (R1+R2)/(R1-R2) \leq 2.45$.

As an example, an on-axis thickness of the first lens L1 is defined as d1, a total optical length from the object-side surface of the first lens L1 to an image plane of the camera optical lens along an optic axis is defined as TTL, and the camera optical lens 10 satisfies: $0.04 \leq d1/TTL \leq 0.17$. This condition can facilitate achieving ultra-thin lenses. As an example, $0.06 \leq d1/TTL \leq 0.13$.

In this embodiment, the second lens L2 has a positive refractive power, and it includes an object-side surface being convex in a paraxial region and an image-side surface being convex in the paraxial region.

As an example, the focal length of the camera optical lens 10 is defined as f, a focal length of the second lens L2 is defined as f2, and the camera optical lens 10 satisfies a condition of $0.75 \leq f2/f \leq 3.49$. By controlling the negative refractive power of the second lens L2 within the reasonable range, correction of aberrations of the optical system can be facilitated. As an example, $1.20 \leq f2/f \leq 2.79$.

As an example, a curvature radius of the object-side surface of the second lens L2 is defined as R3, a curvature radius of the image-side surface of the second lens L2 is defined as R4, the camera optical lens 10 satisfies a condition of $-0.65 \leq (R3+R4)/(R3-R4) \leq -0.01$, which specifies a shape of the second lens L2. This can facilitate correction of an on-axis aberration with development towards ultra-thin lenses. As an example, $-0.41 \leq (R3+R4)/(R3-R4) \leq -0.01$.

As an example, an on-axis thickness of the second lens L2 is defined as d3, the total optical length from the object-side surface of the first lens L1 to an image plane of the camera optical lens 10 along an optic axis is defined as TTL, and the camera optical lens 10 satisfies a condition of $0.08 \leq d3/TTL \leq 0.26$. This condition can facilitate achieving ultra-thin lenses. As an example, $0.13 \leq d3/TTL \leq 0.21$.

The third lens L3 has a positive refractive power, and it includes an object-side surface being convex in a paraxial region and an image-side surface being concave in the paraxial region.

As an example, a curvature radius of the object-side surface of the third lens L3 is defined as R5, a curvature radius of the image-side surface of the third lens L3 is defined as R6, and the camera optical lens 10 satisfies a condition of $-13.40 \leq (R5+R6)/(R5-R6) \leq -0.61$, which specifies a shape of the third lens L3. This condition can alleviate the deflection of light passing through the lens while effectively reducing aberrations. As an example, $-8.38 \leq (R5+R6)/(R5-R6) \leq -0.76$.

As an example, an on-axis thickness of the third lens L3 is defined as d5, the total optical length from the object-side surface of the first lens L1 to an image plane of the camera optical lens 10 along an optic axis is defined as TTL, and the camera optical lens 10 satisfies a condition of $0.02 \leq d5/TTL \leq 0.07$. This can facilitate achieving ultra-thin lenses. As an example, $0.04 \leq d5/TTL \leq 0.06$.

The fourth lens L4 has a positive refractive power, and it includes the object-side surface being concave in a paraxial region and the image-side surface being convex in the paraxial region.

As an example, a focal length of the fourth lens L4 is f4, the focal length of the camera optical lens 10 is f, and the camera optical lens 10 further satisfies a condition of $0.41 \leq f4/f \leq 1.38$, which specifies a ratio of the focal length f4 of the fourth lens L4 to the focal length f of the system. The condition facilitates improving the performance of the optical system. As an example, $0.66 \leq f4/f \leq 1.10$.

As an example, a curvature radius of the object-side surface of the fourth lens L4 is defined as R7, a curvature radius of the image-side surface of the fourth lens L4 is defined as R8, and the camera optical lens 10 satisfies a condition of $0.43 \leq (R7+R8)/(R7-R8) \leq 1.93$, which specifies a shape of the fourth lens L4. This can facilitate correction of an off-axis aberration with development towards ultra-thin, wide-angle lenses. As an example, $0.69 \leq (R7+R8)/(R7-R8) \leq 1.55$.

As an example, an on-axis thickness of the fourth lens L4 is defined as d7, the total optical length from the object-side surface of the first lens L1 to an image plane of the camera optical lens 10 along an optic axis is defined as TTL, the camera optical lens 10 satisfies a condition of $0.11 \leq d7/TTL \leq 0.38$. This can facilitate achieving ultra-thin lenses. As an example, $0.18 \leq d7/TTL \leq 0.30$.

The fifth lens L5 has a negative refractive power, and it includes an object-side surface being convex in a paraxial region and an image-side surface being concave in the paraxial region.

As an example, a focal length of the fifth lens L5 is f5, the focal length of the camera optical lens 10 is f, and the camera optical lens 10 further satisfies a condition of $-2.54 \leq f5/f \leq -0.60$. Limitations on the fifth lens L5 can effectively make a light angle of the camera optical lens 10 gentle and reduce the tolerance sensitivity. As an example, $-1.58 \leq f5/f \leq -0.75$.

As an example, a curvature radius of the object-side surface of the fifth lens L5 is defined as R9, a curvature radius of the image-side surface of the fifth lens L5 is defined as R10, and the camera optical lens 10 satisfies a condition of $0.95 \leq (R9+R10)/(R9-R10) \leq 3.97$, which specifies a shape of the fifth lens L5. This can facilitate correction of an off-axis aberration with development towards ultra-thin, wide-angle lenses. As an example, $1.52 \leq (R9+R10)/(R9-R10) \leq 3.18$.

As an example, an on-axis thickness of the fifth lens L5 is defined as d9, the total optical length from the object-side surface of the first lens L1 to an image plane of the camera optical lens 10 along an optic axis is defined as TTL, and the camera optical lens 10 satisfies a condition of $0.05 \leq d9/TTL \leq 0.17$. This can facilitate achieving ultra-thin lenses. As an example, $0.08 \leq d9/TTL \leq 0.14$.

As an example, an F number FNO of the camera optical lens 10 is smaller than or equal to 2.23, thereby leading to a large aperture.

As an example, a field of view (FOV) of the camera optical lens 10 is greater than or equal to 119°, thereby achieving the wide-angle performance.

As an example, an image height of the camera optical lens 10 is defined as IH, and the camera optical lens 10 satisfies a condition of $TTL/IH \leq 1.81$. This condition can facilitate achieving ultra-thin lenses.

As an example, the focal length of the camera optical lens 10 is defined as f, a combined focal length of the first lens L1 and the second lens L2 as defined as f12, and the camera optical lens 10 satisfies a condition of $2.94 \leq f12/f \leq 42.32$. This can eliminate aberration and distortion of the camera optical lens 10, suppress the back focal length of the camera optical lens 10, and maintain miniaturization of the camera lens system group. As an example, $4.71 \leq f12/f \leq 33.86$.

When the focal length of the camera optical lens 10 of the present disclosure, the focal length and the curvature radius of lens satisfies the above conditions, the camera optical lens 10 will have good optical performance while satisfying design requirements for ultra-thin, wide-angle lenses having large apertures. With these characteristics, the camera optical lens 10 is suitable for camera optical lens assembly of mobile phones and WEB camera optical lenses formed by imaging elements for high pixel such as CCD and CMOS.

In addition, in the camera optical lens 10 provided by this embodiment, the surface of each lens can be set as an aspherical surface, and it is easy for the aspherical surface to be made into a shape other than a spherical surface, to obtain more control variables, for reducing aberrations, thereby reducing the number of lenses used, so that the total length of the camera optical lens 10 can be effectively reduced. In this embodiment, both the object-side surface and the image-side surface of each lens are all aspherical surfaces.

It is worth mentioning that since the first lens L1, the second lens L2, the third lens L3, the fourth lens L4, and the fifth lens L5 have the same structure and parameter relationship as above, the camera optical lens 10 can reasonably allocate the refractive power, spacing and shape of each lens, and thus various aberrations are corrected.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (the total optical length from the object-side surface of the first lens L1 to the image plane of the camera optical lens along the optic axis), in a unit of mm.

F number (FNO): a ratio of an effective focal length of the camera optical lens to an entrance pupil diameter of the camera optical lens.

In addition, at least one of the object-side surface and the image-side surface of each lens can be provided with an inflection point and/or an arrest point to meet the requirements of high-quality imaging, and for specific implementation options, see below.

The design data of the camera optical lens 10 shown in FIG. 1 is shown below.

Table 1 lists the curvature radius of the object-side surface and the curvature radius R of the image-side surface of the first lens L1 to optical filter GF constituting the camera optical lens 10 in the Embodiment 1 of the present disclosure, the on-axis thickness of each lens, the distance d between adjacent lenses, the refractive index nd and the abbe number vd. It should be noted that R and d are both in units of millimeter (mm).

TABLE 1

|  | R |  | d | nd |  | vd |
|---|---|---|---|---|---|---|
| S1 | ∞ | d0= | −0.811 |  |  |  |
| R1 | 6.782 | d1= | 0.486 | nd1 | 1.5661 | v1 | 37.71 |
| R2 | 1.376 | d2= | 0.332 |  |  |  |
| R3 | 2.530 | d3= | 0.810 | nd2 | 1.5444 | v2 | 55.82 |
| R4 | −3.483 | d4= | 0.077 |  |  |  |
| R5 | 1.683 | d5= | 0.230 | nd3 | 1.6153 | v3 | 25.94 |
| R6 | 2.448 | d6= | 0.065 |  |  |  |
| R7 | −14.707 | d7= | 1.053 | nd4 | 1.5444 | v4 | 55.82 |
| R8 | −0.907 | d8= | 0.030 |  |  |  |
| R9 | 2.199 | d9= | 0.539 | nd5 | 1.6700 | v5 | 19.39 |
| R10 | 0.786 | d10= | 0.574 |  |  |  |
| R11 | ∞ | d11= | 0.210 | ndg | 1.5168 | vg | 64.17 |
| R12 | ∞ | d12= | 0.316 |  |  |  |

In the table, meanings of various symbols will be described as follows.

S1: aperture;
R: curvature radius of an optical surface, a central curvature radius for a lens;
R1: curvature radius of the object-side surface of the first lens L1;
R2: curvature radius of the image-side surface of the first lens L1;
R3: curvature radius of the object-side surface of the second lens L2;
R4: curvature radius of the image-side surface of the second lens L2;
R5: curvature radius of the object-side surface of the third lens L3;
R6: curvature radius of the image-side surface of the third lens L3;
R7: curvature radius of the object-side surface of the fourth lens L4;
R8: curvature radius of the image-side surface of the fourth lens L4;
R9: curvature radius of the object-side surface of the fifth lens L5;
R10: curvature radius of the image-side surface of the fifth lens L5;
R11: curvature radius of an object-side surface of the optical filter GF;
R12: curvature radius of an image-side surface of the optical filter GF;
d: on-axis thickness of a lens and an on-axis distance between lenses;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the optical filter GF;
d11: on-axis thickness of the optical filter GF;
d12: on-axis distance from the image-side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF.

Table 2 shows aspherical data of respective lens in the camera optical lens 10 according to Embodiment 1 of the present disclosure.

TABLE 2

| | Conic coefficient | Aspherical coefficients | | | | |
|---|---|---|---|---|---|---|
| | k | A4 | A6 | A8 | A10 | A12 |
| R1 | −1.9785E+02 | 3.6274E−01 | −5.9038E−01 | 1.9759E+00 | −5.4146E+00 | 1.0102E+01 |
| R2 | −6.7795E+01 | 2.9791E+00 | −1.5938E+01 | 7.2221E+01 | −1.0009E+02 | −4.1326E+02 |
| R3 | −1.3276E+02 | 5.8257E−01 | 7.0531E+00 | −1.8278E+02 | 1.7428E+03 | −7.2817E+03 |
| R4 | −4.6014E−01 | −1.0450E+00 | −2.2668E−01 | 1.8991E+01 | −1.2413E+02 | 4.4833E+02 |
| R5 | −1.4304E+01 | −8.2657E−01 | 4.4575E−01 | 3.8736E−01 | −6.3198E+00 | 2.1341E+01 |

TABLE 2-continued

| | | | | | | |
|---|---|---|---|---|---|---|
| R6 | 5.1026E−01 | −6.6413E−02 | −1.8169E+00 | 6.1322E+00 | −1.2792E+01 | 1.9135E+01 |
| R7 | 1.4063E+02 | 3.3727E−01 | −1.3719E+00 | 3.0072E+00 | −3.9183E+00 | 3.5722E+00 |
| R8 | −6.4905E−01 | 2.4039E−01 | −5.6956E−01 | 9.5475E−01 | −7.2389E−01 | 5.6851E−02 |
| R9 | −2.2574E+01 | −1.1825E−01 | −9.0722E−01 | 1.7775E+00 | −1.7472E+00 | 9.6613E−01 |
| R10 | −2.7504E+00 | −4.3558E−01 | 4.2701E−01 | −2.8828E−01 | 1.3307E−01 | −4.1861E−02 |

| | Conic coefficient | Aspherical coefficients | | | |
|---|---|---|---|---|---|
| | k | A14 | A16 | A18 | A20 |
| R1 | −1.9785E+02 | −1.2087E+01 | 8.8626E+00 | −3.6102E+00 | 6.2039E−01 |
| R2 | −6.7795E+01 | 1.6244E+03 | −3.2507E+02 | −4.3221E+03 | 3.2521E+03 |
| R3 | −1.3276E+02 | 9.5744E+02 | 1.0536E+05 | −3.5784E+05 | 3.8354E+05 |
| R4 | −4.6014E−01 | −1.0400E+03 | 1.5828E+03 | −1.4523E+03 | 6.0103E+02 |
| R5 | −1.4304E+01 | −3.5327E+01 | 2.0406E+01 | 2.3301E+01 | −3.1107E+01 |
| R6 | 5.1026E−01 | −1.9527E+01 | 1.2636E+01 | −4.6301E+00 | 7.1710E−01 |
| R7 | 1.4063E+02 | −2.3464E+00 | 9.2463E+00 | −9.4761E−02 | −4.0501E−02 |
| R8 | −6.4905E−01 | 2.8526E−01 | −1.7510E−01 | 4.6632E−02 | −7.2879E−03 |
| R9 | −2.2574E+01 | −3.6213E−01 | 1.0747E−01 | −1.3418E−02 | −1.7710E−03 |
| R10 | −2.7504E+00 | 8.5758E−03 | −1.0393E−03 | 5.9305E−05 | −5.2744E−07 |

In Table 2, k is a conic coefficient, and A4, A6, A8, A10, A12, A14, A16, A18, and A20 are aspherical coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (4)$$

where x is a vertical distance between a point on an aspherical curve and the optic axis, and y is an aspherical depth (a vertical distance between a point on an aspherical surface, having a distance of Rx from the optic axis, and a surface tangent to a vertex of the aspherical surface on the optic axis).

In the present embodiment, an aspherical surface of each lens surface uses the aspherical surfaces shown in the above condition (4). However, the present disclosure is not limited to the aspherical polynomial form shown in the condition (4).

Table 3 and Table 4 show design data of inflexion points and arrest points of respective lens in the camera optical lens 10 of this embodiment. P1R1 and P1R2 represent the object-side surface and the image-side surface of the first lens L1, respectively; P2R1 and P2R2 represent the object-side surface and the image-side surface of the second lens L2, respectively; P3R1 and P3R2 represent the object-side surface and the image-side surface of the third lens L3, respectively; P4R1 and P4R2 represent the object-side surface and the image-side surface of the fourth lens L4, respectively; and P5R1 and P5R2 represent the object-side surface and the image-side surface of the fifth lens L5, respectively. The data in the column "inflexion point position" refers to vertical distances from inflexion points arranged on each lens surface to the optic axis of the camera optical lens 10. The data in the column "arrest point position" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 | Inflexion point position 4 |
|---|---|---|---|---|---|
| P1R1 | 1 | 1.065 | / | / | / |
| P1R2 | 1 | 0.595 | / | / | / |
| P2R1 | 0 | / | / | / | / |
| P2R2 | 0 | / | / | / | / |
| P3R1 | 1 | 0.225 | / | / | / |
| P3R2 | 3 | 0.335 | 0.815 | 0.925 | / |

TABLE 3-continued

| | Number of inflexion points | Inflexion point position 1 | Inflexion point position 2 | Inflexion point position 3 | Inflexion point position 4 |
|---|---|---|---|---|---|
| P4R1 | 4 | 0.155 | 0.435 | 0.565 | 1.025 |
| P4R2 | 2 | 0.975 | 1.235 | / | / |
| P5R1 | 3 | 0.305 | 1.175 | 1.345 | / |
| P5R2 | 2 | 0.455 | 1.965 | / | / |

TABLE 4

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 1 | 0.395 | / |
| P3R2 | 1 | 0.595 | / |
| P4R1 | 2 | 0.305 | 1.095 |
| P4R2 | 0 | / | / |
| P5R1 | 1 | 0.515 | / |
| P5R2 | 1 | 1.145 | / |

Table 13 below further lists various values of Embodiments 1, 2 and 3 and values corresponding to parameters which are specified in the above conditions.

As shown in Table 3, Embodiment 1 satisfies the various conditions.

Figure 2:
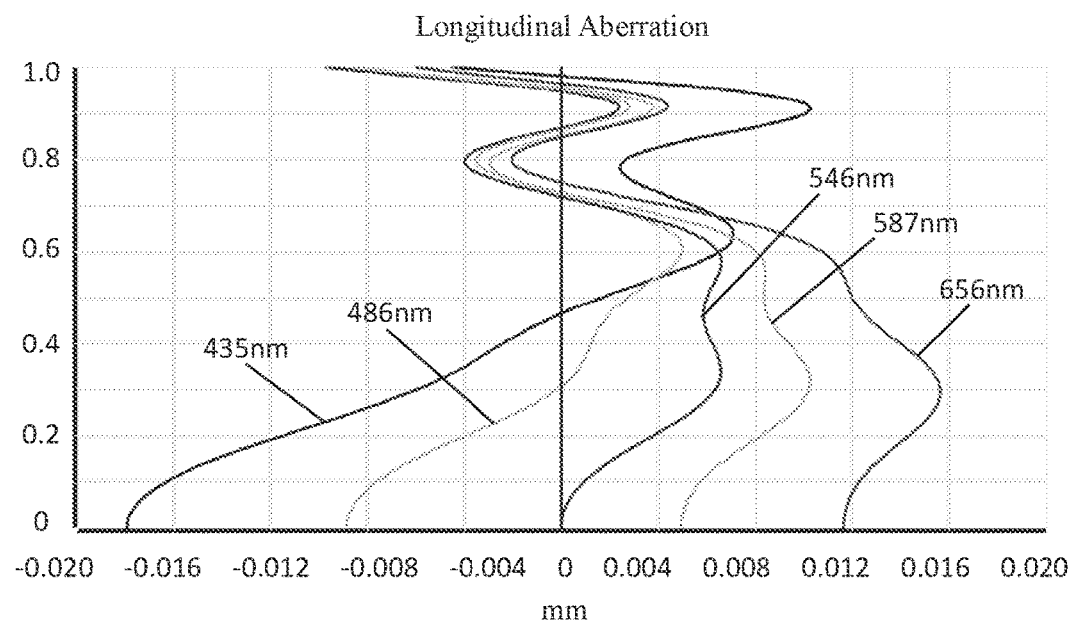
FIG. 2 is a schematic diagram of a longitudinal aberration of the camera optical lens shown in FIG. 1.
Figure 3:
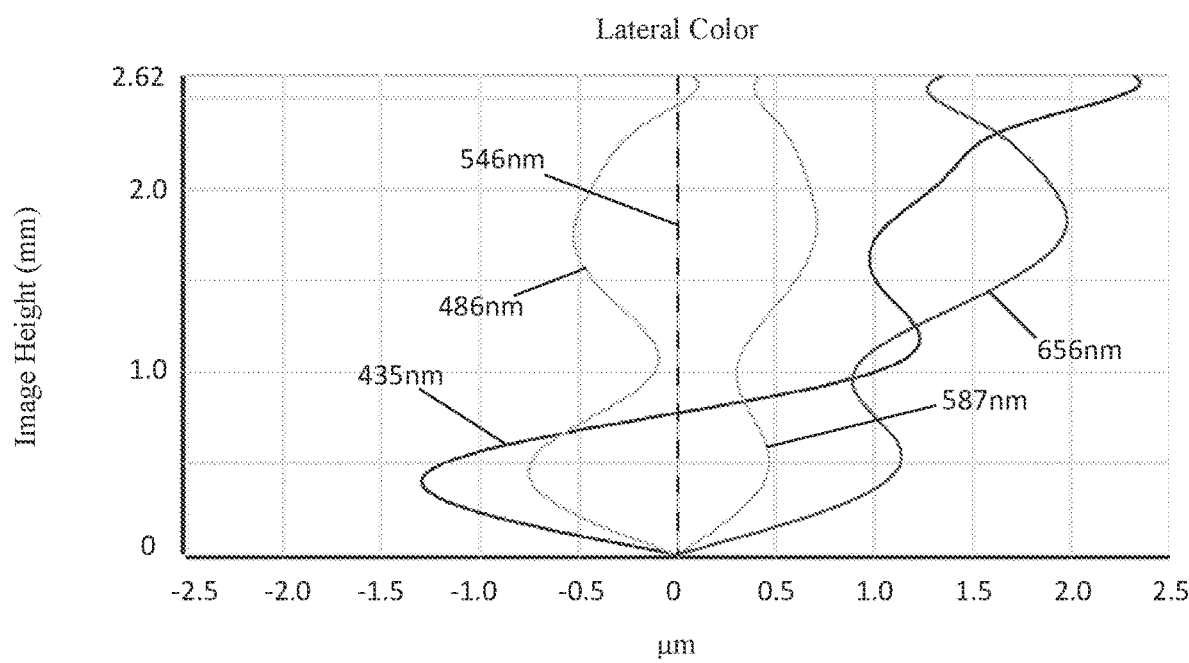
FIG. 3 is a schematic diagram of a lateral color of the camera optical lens shown in FIG. 1.
Figure 4:
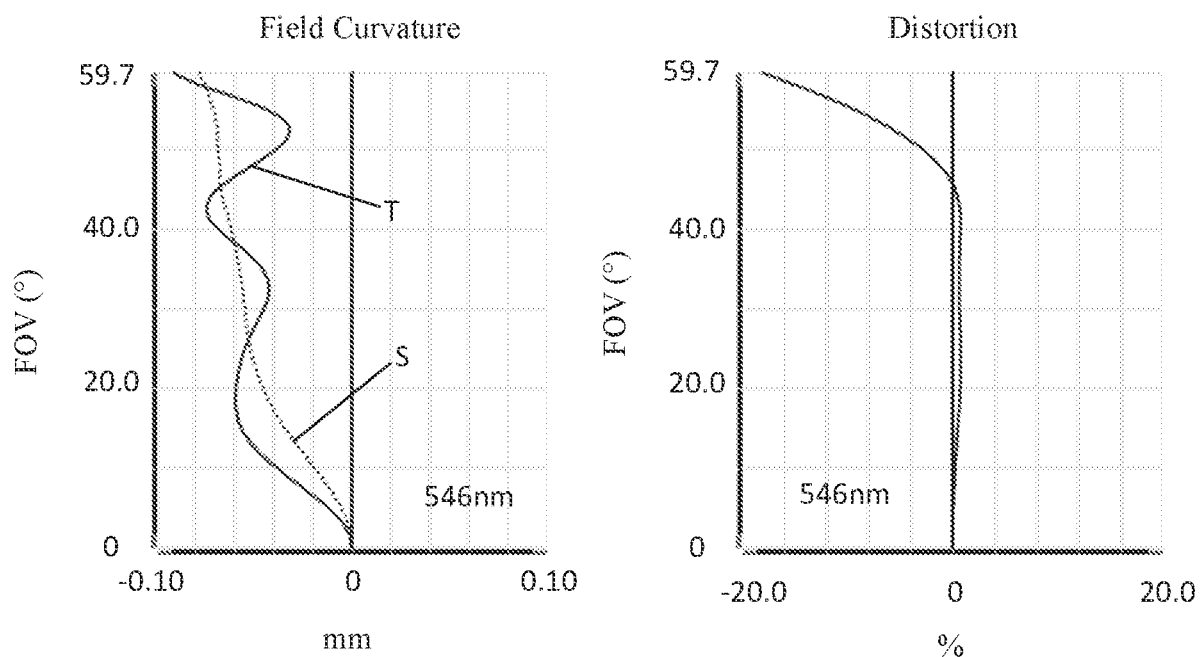
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 435 nm, 486 nm, 546 nm, 587 nm and 656 nm after passing the camera optical lens 10. FIG. 4 illustrates a field curvature and a distortion of light with a wavelength of 546 nm after passing the camera optical lens 10, in which a field curvature S is a field curvature in a sagittal direction and T is a field curvature in a tangential direction.

In this embodiment, the entrance pupil diameter ENPD of the camera optical lens 10 is 0.843 mm. The image height IH is 2.62 mm. The field of view (FOV) along a diagonal direction is 119.40°. Thus, the camera optical lens 10 can satisfy design requirements of ultra-thin, large-aperture and wide-angle while having on-axis and off-axis aberrations sufficiently corrected, thereby leading to better optical characteristics.

Embodiment 2

Figure 5:
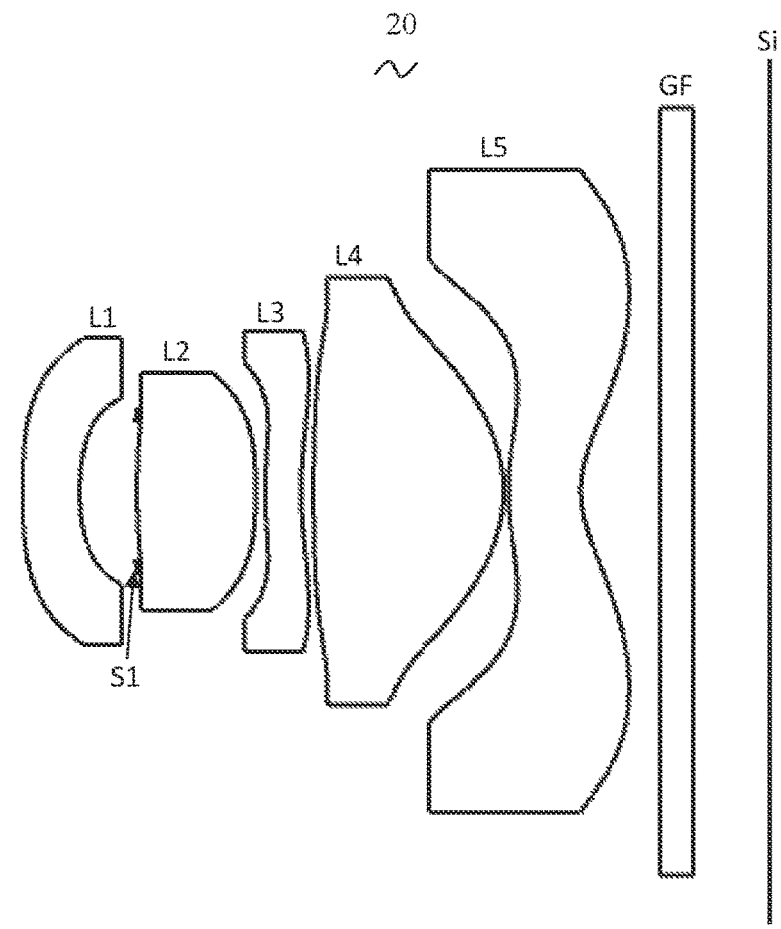
FIG. 5 is a schematic diagram of a structure of a camera optical lens in accordance with Embodiment 2 of the present disclosure.

FIG. 5 is a structural schematic diagram of the camera optical lens 20 in Embodiment 2. Embodiment 2 is basically the same as Embodiment 1 and involves symbols having the same meanings as Embodiment 1, and the same portions will not be repeated. Only differences therebetween will be described in the following.

The fourth lens L4 includes the object-side surface being convex in the paraxial region.

Table 5 and Table 6 show design data of a camera optical lens 20 in Embodiment 2 of the present disclosure.

TABLE 5

| | R | d | | nd | | vd |
|---|---|---|---|---|---|---|
| S1 | ∞ | d0= | −0.719 | | | |
| R1 | 4.436 | d1= | 0.362 | nd1 | 1.5661 | v1 | 37.71 |
| R2 | 1.523 | d2= | 0.359 | | | |
| R3 | 4.595 | d3= | 0.749 | nd2 | 1.5444 | v2 | 55.82 |
| R4 | −4.733 | d4= | 0.060 | | | |
| R5 | 2.044 | d5= | 0.230 | nd3 | 1.6153 | v3 | 25.94 |
| R6 | 2.761 | d6= | 0.078 | | | |
| R7 | 12.676 | d7= | 1.199 | nd4 | 1.5444 | v4 | 55.82 |
| R8 | −0.913 | d8= | 0.030 | | | |
| R9 | 1.531 | d9= | 0.461 | nd5 | 1.6700 | v5 | 19.39 |
| R | 0.692 | d10= | 0.500 | | | |
| R11 | ∞ | d11= | 0.210 | ndg | 1.5168 | vg | 64.17 |
| R12 | ∞ | d12= | 0.482 | | | |

Table 6 shows aspherical data of respective lenses in the camera optical lens 20 according to Embodiment 2 of the present disclosure.

TABLE 6

| | Conic coefficient | Aspherical coefficients | | | | |
|---|---|---|---|---|---|---|
| | k | A4 | A6 | A8 | A10 | A12 |
| R1 | −2.0984E+01 | 3.6197E−01 | −2.1391E−02 | −1.6380E+00 | 9.1373E+00 | −2.6083E+01 |
| R2 | −1.5585E+01 | 1.0572E+00 | 7.2051E+00 | −1.6540E+02 | 1.9860E+03 | −1.4287E+04 |
| R3 | −8.9488E+01 | 7.4258E−02 | 2.8562E+00 | −6.2844E+01 | 7.4066E+02 | −5.1697E+03 |
| R4 | 9.9803E+00 | −1.0609E+00 | 3.1552E+00 | −1.7488E+01 | 6.7504E+01 | −1.5715E+02 |
| R5 | −6.1418E+00 | −7.7173E−01 | 1.0699E+00 | −2.5755E+00 | −9.0464E+00 | 8.2065E+01 |
| R6 | 7.6531E−01 | 4.1437E−02 | −2.2499E+00 | 1.0862E+01 | −3.2214E+01 | 6.2488E+01 |
| R7 | −1.0000E+01 | 2.0042E−01 | −2.0092E+00 | 8.9624E+00 | −2.1673E+01 | 3.2025E+01 |
| R8 | −6.5617E−01 | 7.2156E−02 | 4.0611E−01 | −1.8816E+00 | 4.2979E+00 | −5.6978E+00 |
| R9 | −2.0111E+01 | 5.0544E−02 | −1.1227E+00 | 2.3069E+00 | −2.9490E+00 | 2.5836E+00 |
| R10 | −2.6352E+00 | −3.8245E−01 | 3.5507E−01 | −2.3176E−01 | 1.0202E−01 | −2.9197E−02 |

| | Conic coefficient | Aspherical coefficients | | | |
|---|---|---|---|---|---|
| | k | A14 | A16 | A18 | A20 |
| R1 | −2.0984E+01 | 4.4895E+01 | −4.6454E+01 | 2.6786E+01 | −6.6481E+00 |
| R2 | −1.5585E+01 | 6.3881E+04 | −1.7296E+05 | 2.5991E+05 | −1.6611E+05 |
| R3 | −8.9488E+01 | 2.1610E+04 | −5.2593E+04 | 6.7815E+04 | −3.5184E+04 |
| R4 | 9.9803E+00 | 1.8250E+02 | −2.7871E+00 | −2.1737E+02 | 1.5669E+02 |
| R5 | −6.1418E+00 | −2.6133E+02 | 4.4570E+02 | −4.0053E+02 | 1.4857E+02 |
| R6 | 7.6531E−01 | −7.9612E+01 | 6.4171E+01 | −2.9637E+01 | 5.9713E+00 |
| R7 | −1.0000E+01 | −2.9943E+01 | 1.7362E+01 | −5.7129E+00 | 8.1579E−01 |
| R8 | −6.5617E−01 | 4.6041E+00 | −2.1980E+00 | 5.6624E−01 | −6.0649E−02 |
| R9 | −2.0111E+01 | −1.5534E+00 | 6.0115E−01 | −1.3143E−01 | 1.2122E−02 |
| R10 | −2.6352E+00 | 4.8872E−03 | −3.3630E−04 | −1.7621E−05 | 3.1055E−06 |

Table 7 and Table 8 show design data of inflexion points and arrest points of respective lens in the camera optical lens 20.

TABLE 7

| | Number of inflexion points | Inflexion point position 1 | Inflexion point position 2 | Inflexion point position 3 |
|---|---|---|---|---|
| P1R1 | 1 | 0.965 | / | / |
| P1R2 | 0 | / | / | / |
| P2R1 | 0 | / | / | / |
| P2R2 | 0 | / | / | / |
| P3R1 | 2 | 0.245 | 0.805 | / |
| P3R2 | 2 | 0.395 | 0.975 | / |
| P4R1 | 1 | 0.995 | / | / |
| P4R2 | 2 | 0.955 | 1.265 | / |
| P5R1 | 3 | 0.355 | 1.285 | 1.455 |
| P5R2 | 2 | 0.475 | 1.945 | / |

TABLE 8

| | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 1 | 0.415 |
| P3R2 | 1 | 0.715 |

TABLE 8-continued

| | Number of arrest points | Arrest point position 1 |
|---|---|---|
| P4R1 | 0 | / |
| P4R2 | 0 | / |
| P5R1 | 1 | 0.625 |
| P5R2 | 1 | 1.245 |

Table 13 below further lists various values of Embodiment 2 and values corresponding to parameters which are specified in the above conditions. Obviously, the camera optical lens of this embodiment satisfies the various conditions.

Figure 6:
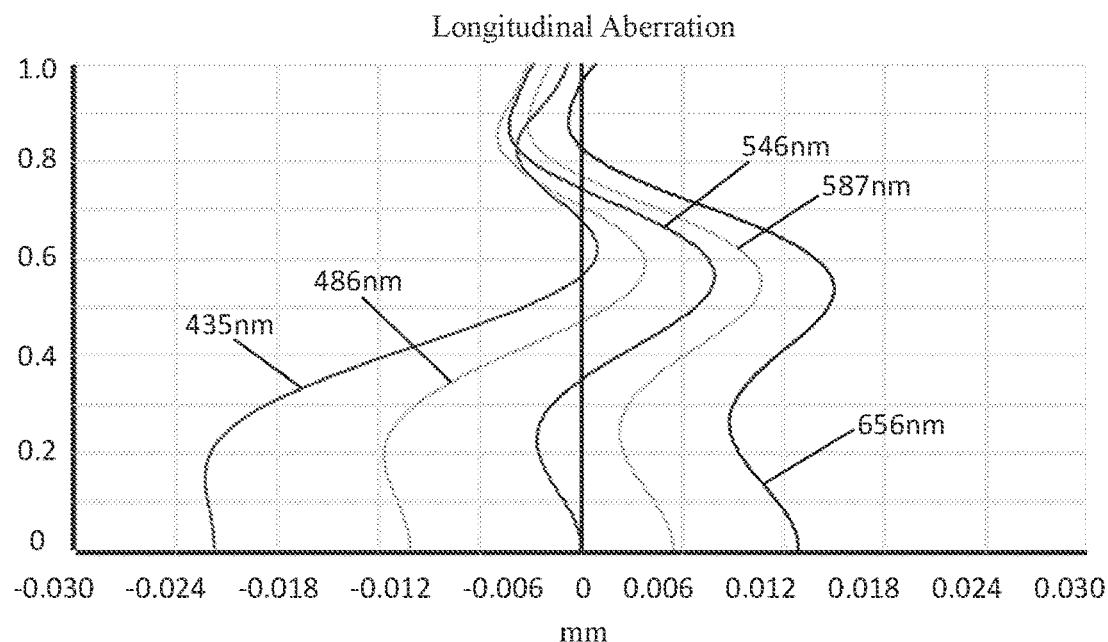
FIG. 6 is a schematic diagram of a longitudinal aberration of the camera optical lens shown in FIG. 5.
Figure 7:
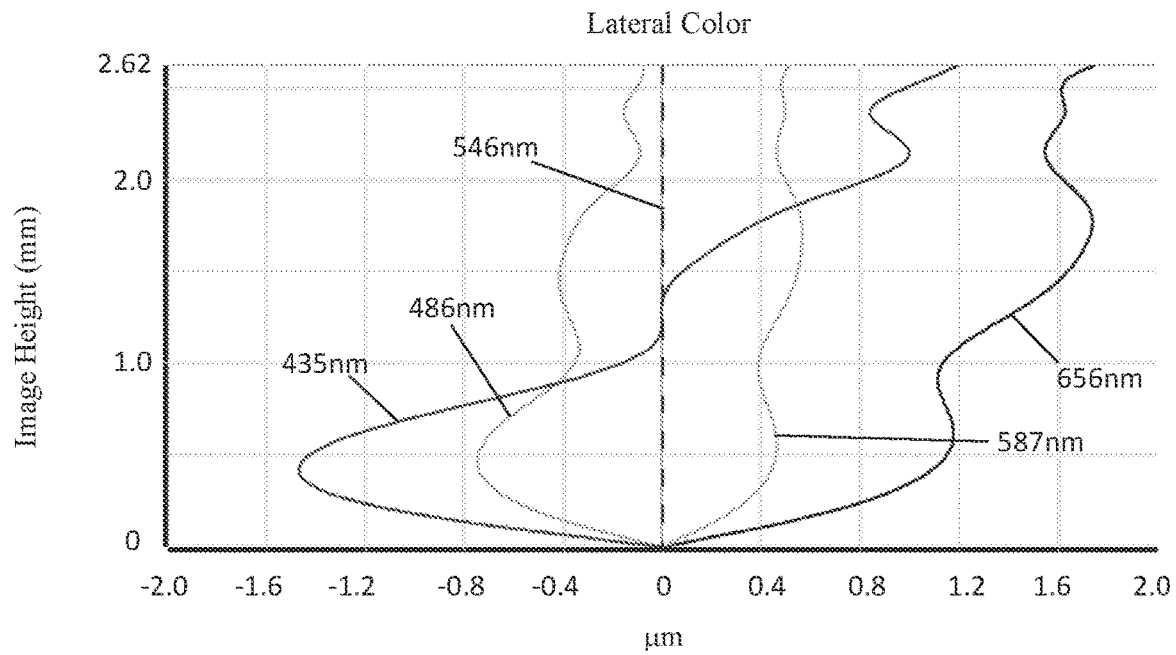
FIG. 7 is a schematic diagram of a lateral color of the camera optical lens shown in FIG. 5.
Figure 8:
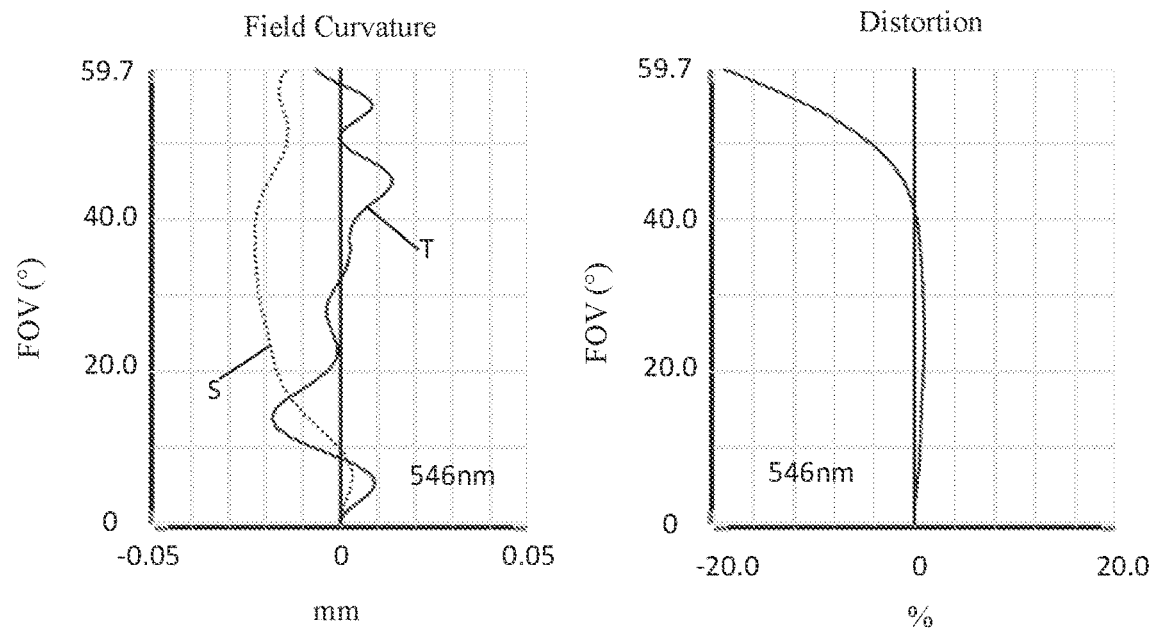
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 435 nm, 486 nm, 546 nm, 587 nm and 656 nm after passing the camera optical lens 20. FIG. 8 illustrates a field curvature and a distortion of light with a wavelength of 546 nm after passing the camera optical lens 20, in which a field curvature S is a field curvature in a sagittal direction and T is a field curvature in a tangential direction.

In this embodiment, the entrance pupil diameter ENPD of the camera optical lens 20 is 0.850 mm. The image height IH is 2.62 mm. The field of view (FOV) along a diagonal direction is 119.40°. Thus, the camera optical lens 20 can satisfy design requirements of ultra-thin, large-aperture and wide-angle while having on-axis and off-axis aberrations sufficiently corrected, thereby leading to better optical characteristics.

Embodiment 3

Figure 9:
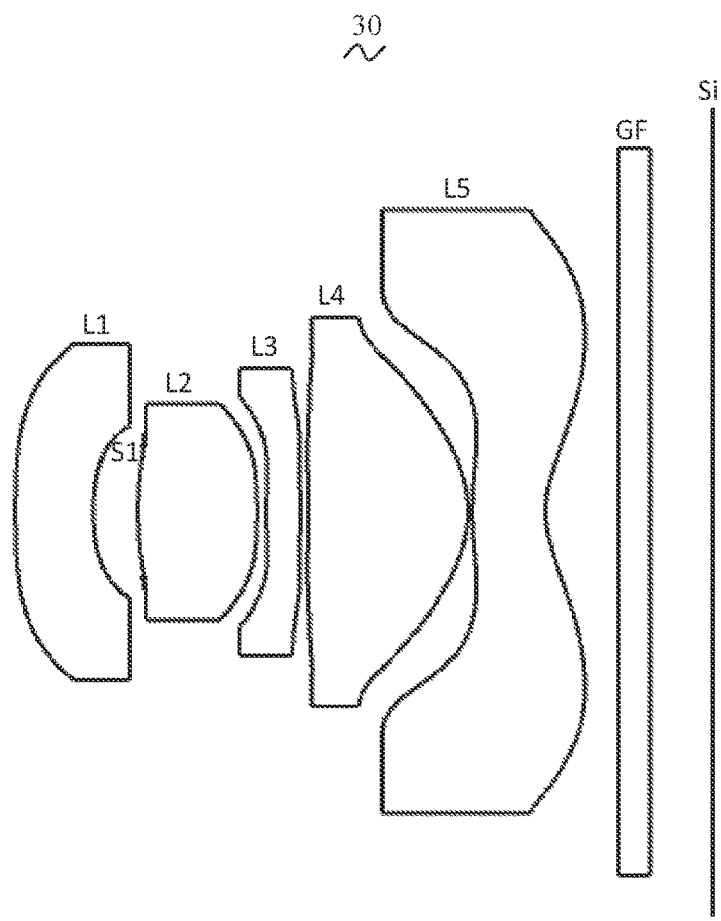
FIG. 9 is a schematic diagram of a structure of a camera optical lens in accordance with Embodiment 3 of the present disclosure.

FIG. 9 is a structural schematic diagram of the camera optical lens 30 in Embodiment 3. Embodiment 3 is basically the same as Embodiment 1 and involves symbols having the same meanings as Embodiment 1, and the same portions will not be repeated. Only differences therebetween will be described in the following.

In this embodiment, the third lens L3 has the image-side surface being convex in the paraxial region.

Table 9 and Table 10 show design data of a camera optical lens 30 in Embodiment 3 of the present disclosure.

TABLE 9

| | R | d | | nd | | vd |
|---|---|---|---|---|---|---|
| S1 | ∞ | d0= | −0.866 | | | |
| R1 | 7.628 | d1= | 0.529 | nd1 | 1.5661 v1 | 37.71 |
| R2 | 1.517 | d2= | 0.299 | | | |
| R3 | 2.645 | d3= | 0.810 | nd2 | 1.5444 v2 | 55.82 |
| R4 | −5.184 | d4= | 0.060 | | | |
| R5 | 3.054 | d5= | 0.230 | nd3 | 1.6153 v3 | 25.94 |
| R6 | −67.851 | d6= | 0.060 | | | |
| R7 | −6.203 | d7= | 1.077 | nd4 | 1.5444 v4 | 55.82 |
| R8 | −0.784 | d8= | 0.030 | | | |
| R9 | 2.204 | d9= | 0.495 | nd5 | 1.6700 v5 | 19.39 |
| R10 | 0.684 | d10= | 0.500 | | | |
| R11 | ∞ | d11= | 0.210 | ndg | 1.5168 vg | 64.17 |
| R12 | ∞ | d12= | 0.420 | | | |

Table 10 shows aspherical data of respective lenses in the camera optical lens 30 according to Embodiment 3 of the present disclosure.

TABLE 10

| | Conic coefficient | Aspherical coefficients | | | | |
|---|---|---|---|---|---|---|
| | k | A4 | A6 | A8 | A10 | A12 |
| R1 | −4.6344E+01 | 2.3564E−01 | −8.7496E−03 | −3.7052E−01 | 9.3162E−01 | −1.0801E+00 |
| R2 | −1.6361E+01 | 9.8963E−01 | 6.4026E+00 | −9.6575E+01 | 7.3304E+02 | −2.9877E+03 |
| R3 | −1.1122E+01 | 1.5454E−01 | 2.5776E−01 | −1.2295E+00 | 2.0200E+00 | 0.0000E+00 |
| R4 | 8.6441E+00 | −1.4640E+00 | 6.4427E+00 | −4.3736E+01 | 1.9040E+02 | −5.0306E+02 |
| R5 | −1.5000E+01 | −1.2878E+00 | 4.8496E+00 | −2.2767E+01 | 7.7526E+00 | 3.1410E+02 |
| R6 | −1.0000E+01 | −3.3012E−01 | 4.8256E+00 | −2.8001E+01 | 7.9265E+01 | −1.3060E+02 |
| R7 | 8.0511E+00 | 8.6382E−04 | 3.3300E+00 | −1.6582E+01 | 4.1437E+01 | −6.3710E+01 |
| R8 | −7.1893E−01 | 3.3148E−01 | −1.4604E−02 | −1.3449E+00 | 3.9433E+00 | −5.3404E+00 |
| R9 | −3.6795E+01 | −2.3470E−01 | 1.6167E−01 | −1.4488E+00 | 3.9823E+00 | −5.4041 E+00 |
| R10 | −4.0204E+00 | −2.5940E−01 | 2.1508E−01 | −1.3868E−01 | 7.0052E−02 | −2.9375E−02 |

| | Conic coefficient | Aspherical coefficients | | | |
|---|---|---|---|---|---|
| | k | A14 | A16 | A18 | A20 |
| R1 | −4.6344E+01 | 6.3981E−01 | −1.5388E−01 | 0.0000E+00 | 0.0000E+00 |
| R2 | −1.6361E+01 | 6.3713E+03 | −5.4455E+03 | 0.0000E+00 | 0.0000E+00 |
| R3 | −1.1122E+01 | 0.0000E+00 | 0.0000E+00 | 0.0000E+00 | 0.0000E+00 |
| R4 | 8.6441E+00 | 8.1944E+02 | −7.6886E+02 | 3.1991E+02 | 0.0000E+00 |
| R5 | −1.5000E+01 | −1.2508E+03 | 2.2888E+03 | −2.1384E+03 | 8.2218E+02 |
| R6 | −1.0000E+01 | 1.3375E+02 | −8.4027E+01 | 2.9288E+01 | −4.2233E+00 |
| R7 | 8.0511E+00 | 6.3357E+01 | −3.9945E+01 | 1.4552E+01 | −2.3360E+00 |
| R8 | −7.1893E−01 | 3.8384E+00 | −1.4299E+00 | 2.3669E−01 | −9.0705E−03 |
| R9 | −3.6795E+01 | 4.0001E+00 | −1.6364E+00 | 3.4804E−01 | −3.0096E−02 |
| R10 | −4.0204E+00 | 9.3811E−03 | −1.9870E−03 | 2.3966E−04 | −1.2262E−05 |

Table 11 and Table 12 show design data of inflexion points and arrest points of respective lens in the camera optical lens 30.

TABLE 11

| | Number of inflexion points | Inflexion point position 1 | Inflexion point position 2 | Inflexion point position 3 | Inflexion point position 4 |
|---|---|---|---|---|---|
| P1R1 | 1 | 1.125 | / | / | / |
| P1R2 | 0 | / | / | / | / |
| P2R1 | 0 | / | / | / | / |
| P2R2 | 1 | 0.715 | / | / | / |

TABLE 11-continued

| | Number of inflexion points | Inflexion point position 1 | Inflexion point position 2 | Inflexion point position 3 | Inflexion point position 4 |
|---|---|---|---|---|---|
| P3R1 | 1 | 0.165 | / | / | / |
| P3R2 | 4 | 0.235 | 0.355 | 0.715 | 0.895 |
| P4R1 | 4 | 0.235 | 0.595 | 0.765 | 1.015 |
| P4R2 | 1 | 1.045 | / | / | / |
| P5R1 | 2 | 0.285 | 1.175 | / | / |
| P5R2 | 2 | 0.455 | 1.915 | / | / |

TABLE 12

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 1 | 0.285 | / |
| P3R2 | 0 | / | / |
| P4R1 | 2 | 0.385 | 1.075 |
| P4R2 | 0 | / | / |
| P5R1 | 1 | 0.515 | / |
| P5R2 | 1 | 1.185 | / |

Table 13 below further lists various values of Embodiment 3 and values corresponding to parameters which are specified in the above conditions. Obviously, the camera optical lens of this embodiment satisfies the various conditions.

Figure 10:
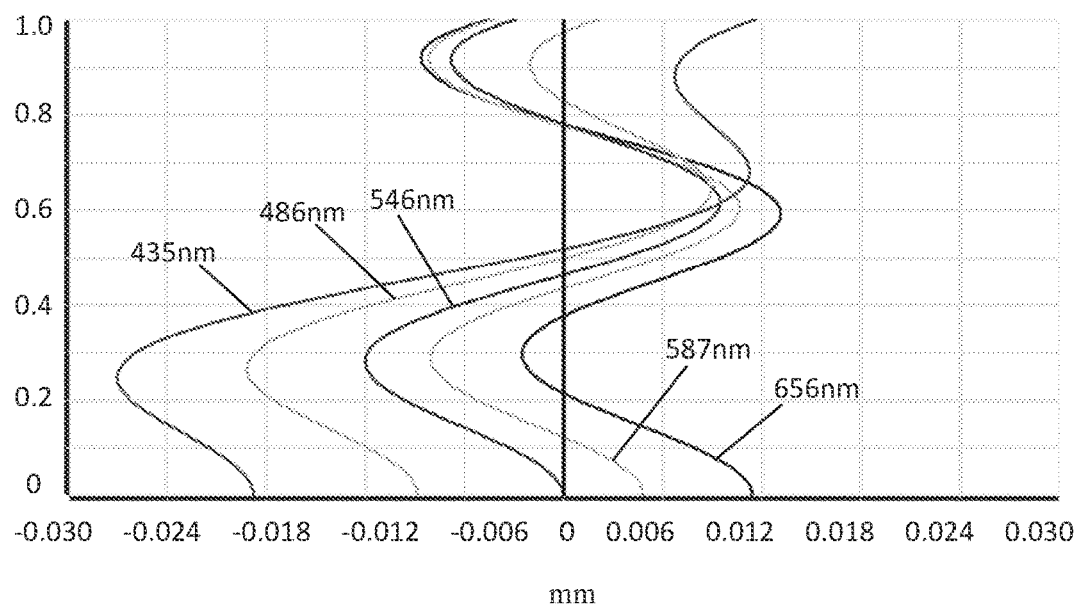
FIG. 10 is a schematic diagram of a longitudinal aberration of the camera optical lens shown in FIG. 9.
Figure 11:
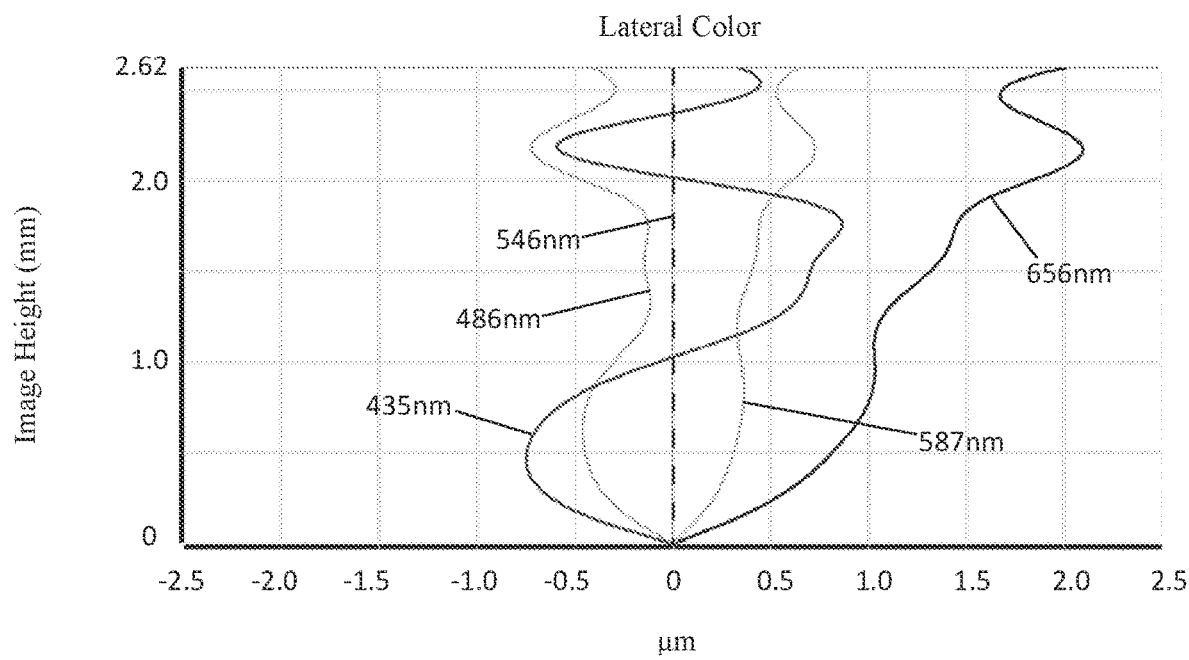
FIG. 11 is a schematic diagram of a lateral color of the camera optical lens shown in FIG. 9.
Figure 12:
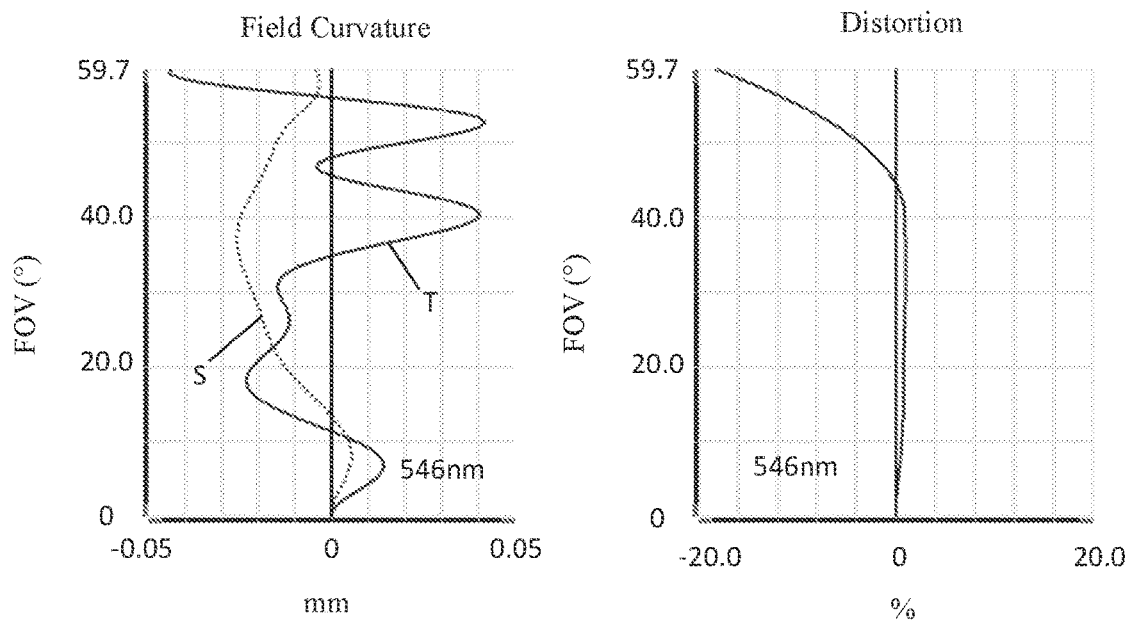
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 435 nm, 486 nm, 546 nm, 587 nm and 656 nm after passing the camera optical lens 30. FIG. 12 illustrates a field curvature and a distortion of light with a wavelength of 546 nm after passing the camera optical lens 30, in which a field curvature S is a field curvature in a sagittal direction and T is a field curvature in a tangential direction.

In this embodiment, the entrance pupil diameter ENPD of the camera optical lens 30 is 0.842 mm. The image height IH is 2.62 mm. The field of view (FOV) along a diagonal direction is 119.40°. Thus, the camera optical lens 30 can satisfy design requirements of ultra-thin, large-aperture and wide-angle while having on-axis and off-axis aberrations sufficiently corrected, thereby leading to better optical characteristics.

Table 13 below further lists various values of Embodiment 1, Embodiment 2, and Embodiment 3 and values corresponding to parameters which are specified in the above conditions.

TABLE 13

| Parameters and Conditions | Embodiment 1 | Embodiment 2 | Embodiment 3 |
|---|---|---|---|
| f3/f | 4.16 | 5.98 | 2.52 |
| R4/R3 | −1.38 | −1.03 | −1.96 |
| d1/d2 | 1.46 | 1.01 | 1.77 |
| f | 1.872 | 1.886 | 1.870 |
| f1 | −3.133 | −4.263 | −3.432 |
| f2 | 2.814 | 4.389 | 3.325 |
| f3 | 7.778 | 11.280 | 4.712 |
| f4 | 1.721 | 1.607 | 1.535 |
| f5 | −2.130 | −2.391 | −1.686 |
| f12 | 11.019 | 53.214 | 22.654 |
| FNO | 2.22 | 2.22 | 2.22 |
| TTL | 4.722 | 4.720 | 4.720 |
| FOV | 119.40 | 119.40 | 119.40 |
| IH | 2.62 | 2.62 | 2.62 |

The above are only the embodiments of the present disclosure. It should be pointed out here that for those of ordinary skill in the art, improvements can be made without departing from the inventive concept of the present disclosure, but these all belong to the scope of the present disclosure.

What is claimed is:

1. A camera optical lens, comprising, from an object side to an image side:
   a first lens having a negative refractive power;
   a second lens having a positive refractive power;
   a third lens having a positive refractive power;
   a fourth lens having a positive refractive power; and
   a fifth lens having a negative refractive power,
   wherein the camera optical lens satisfies:

$2.50 \leq f3/f \leq 6.00$;

$-2.00 \leq R4/R3 \leq -1.00$; and $1.00 \leq d1/d2 \leq 1.80$, where f denotes a focal length of the camera optical lens; f3 denotes a focal length of the third lens; R3 denotes a curvature radius of an object-side surface of the second lens; R4 denotes a curvature radius of an image-side surface of the second lens; d1 denotes an on-axis thickness of the first lens; and d2 denotes an on-axis distance from an image-side surface of the first lens to the object-side surface of the second lens.

2. The camera optical lens as described in claim 1, wherein the camera optical lens further satisfies: $-1.50 \leq f5/f4 \leq -1.00$, where f4 denotes a focal length of the fourth lens; and f5 denotes a focal length of the fifth lens.

3. The camera optical lens as described in claim 1, wherein the camera optical lens further satisfies:

$-4.52 \leq f1/f \leq -1.12$;

$0.75 \leq (R1+R2)/(R1-R2) \leq 3.07$; and $0.04 \leq d1/TTL \leq 0.17$, where f1 denotes a focal length of the first lens; R1 denotes a curvature radius of an object-side surface of the first lens; R2 denotes a curvature radius of the image-side surface of the first lens; and TTL denotes a total optical length from the object-side surface of the first lens to an image plane of the camera optical lens along an optic axis.

4. The camera optical lens as described in claim 1, wherein the camera optical lens further satisfies:

$0.75 \leq f2/f \leq 3.49$;

$-0.65 \leq (R3+R4)/(R3-R4) \leq -0.01$; and $0.08 \leq d3/TTL \leq 0.26$, where f2 denotes a focal length of the second lens; d3 denotes an on-axis thickness of the second lens; and TTL denotes a total optical length from an object-side surface of the first lens to an image plane of the camera optical lens along an optic axis.

5. The camera optical lens as described in claim 1, wherein the camera optical lens further satisfies:

$-13.40 \leq (R5+R6)/(R5-R6) \leq -0.61$; and $0.02 \leq d5/TTL \leq 0.07$, where R5 denotes a curvature radius of an object-side surface of the third lens; R6 denotes a curvature radius of an image-side surface of the third lens; d5 denotes an on-axis thickness of the third lens; and TTL denotes a total optical length from an object-side surface of the first lens to an image plane of the camera optical lens along an optic axis.

6. The camera optical lens as described in claim 1, wherein the camera optical lens further satisfies:

$0.41 \leq f4/f \leq 1.38$;

$0.43 \leq (R7+R8)/(R7-R8) \leq 1.93$; and $0.11 \leq d7/TTL \leq 0.38$, where f4 denotes a focal length of the fourth lens; R7 denotes a curvature radius of an object-side surface of the fourth lens; R8 denotes a curvature radius of an image-side surface of the fourth lens; d7 denotes an on-axis thickness of the fourth lens; and TTL denotes a total optical length from an object-side surface of the first lens to an image plane of the camera optical lens along an optic axis.

7. The camera optical lens as described in claim 1, wherein the camera optical lens further satisfies:

$-2.54 \leq f5/f \leq -0.60$;

$0.95 \leq (R9+R10)/(R9-R10) \leq 30.97$; and $0.05 \leq d9/TTL \leq 0.17$, where f5 denotes a focal length of the fifth lens; R9 denotes a curvature radius of an object-side surface of the fifth lens; R10 denotes a curvature radius of an image-side surface of the fifth lens; d9 denotes an on-axis thickness of the fifth lens; and TTL denotes a total optical length from an object-side surface of the first lens to an image plane of the camera optical lens along an optic axis.

8. The camera optical lens as described in claim 1, wherein the camera optical lens further satisfies: $FNO \leq 2.23$, where FNO denotes an F number of the camera optical lens.

9. The camera optical lens as described in claim 1, wherein the camera optical lens further satisfies: $FOV \geq 119°$, where FOV denotes a field of view of the camera optical lens.

10. The camera optical lens as described in claim 1, wherein the camera optical lens further satisfies: $2.94 \leq f12/f \leq 42.32$, where f12 denotes a combined focal length of the first lens and the second lens.

* * * * *